(12) United States Patent  (10) Patent No.: US 6,926,242 B2
Hall                      (45) Date of Patent: Aug. 9, 2005

(54) FIXING APPARATUS

(75) Inventor: Jacob R. Hall, Midway, UT (US)

(73) Assignee: Cateye Co., Ltd., Osaka (JP)

( * ) Notice: Subject to any disclaimer, the term of this patent is extended or adjusted under 35 U.S.C. 154(b) by 0 days.

(21) Appl. No.: 10/646,974

(22) Filed: Aug. 22, 2003

(65) Prior Publication Data

US 2005/0040304 A1 Feb. 24, 2005

(51) Int. Cl.7 ................................................. E04G 3/04
(52) U.S. Cl. ...................... 248/230.4; 224/420; 403/157
(58) Field of Search ........................... 248/230.4, 230.8, 248/230.9, 231.1, 229.13, 229.23, 316.5; 224/420, 448, 453, 413; 403/157

(56) References Cited

U.S. PATENT DOCUMENTS

| 4,702,447 | A | * | 10/1987 | Westwood, III | 248/231.51 |
| 5,096,150 | A | * | 3/1992 | Westwood | 248/231.51 |
| 5,735,441 | A | | 4/1998 | Fujimoto | 224/420 |
| 5,934,721 | A | * | 8/1999 | Walde | 294/3 |
| 6,186,383 | B1 | * | 2/2001 | Kobdish | 224/420 |
| 6,450,465 | B1 | * | 9/2002 | Eslick | 248/230.4 |
| 2002/0159253 | A1 | | 10/2002 | Dalebout et al. | 362/191 |
| 2004/0089778 | A1 | * | 5/2004 | Valentine et al. | 248/229.13 |

FOREIGN PATENT DOCUMENTS

| FR | 679 354 | 4/1930 |
| JP | 63-29667 | 8/1988 |
| JP | 8-113175 | 5/1996 |
| JP | 2602582 | 1/2000 |

* cited by examiner

Primary Examiner—Ramon O. Ramirez
(74) Attorney, Agent, or Firm—Olson & Hierl, Ltd.

(57) ABSTRACT

With an aim to provide a fixing apparatus capable of maintaining strong fixation with a simplified mechanism in a stable manner for a long time, a fixing apparatus fixing a headlamp to an object includes a plurality of arms having one end connected to each other, having free another end, and capable of changing a range of enclosure so as to grasp the object, a base member supporting the connected plurality of arms, and a nut changing a position relative to the base member, engaging to the base member, and pressing its edge against the plurality of arms to change an angle of enclosure by the arms.

5 Claims, 5 Drawing Sheets

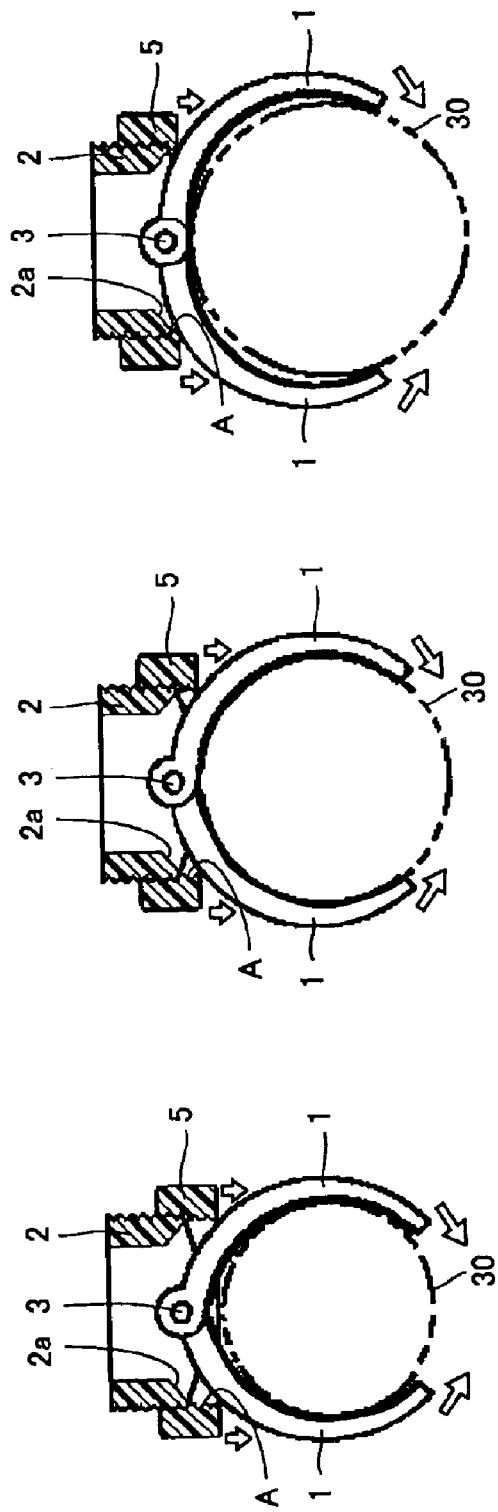

FIXING APPARATUS

BACKGROUND OF THE INVENTION

1. Field of the Invention

The present invention relates to a fixing apparatus, and more particularly to a general-purpose fixing apparatus for fixing a prescribed component to an object.

2. Description of the Background Art

A number of fixing apparatuses have conventionally been proposed for a bicycle, in order to attach components such as a headlamp, a speed meter or the like to a handlebar or the like. For example, Japanese Patent Laying-Open No. 8-113175 (U.S. Pat. No. 5,735,441) proposes a fixing apparatus composed of three separate portions fixed to one another. The three separate portions are: (a1) a handlebar mount portion; (a2) an intermediate portion; and (a3) a component attachment portion fixed to the handlebar mount portion with the intermediate portion interposed. The handlebar mount portion (a1) located in a root portion of the fixing apparatus includes a pipe securing portion clamping a pipe portion of the handlebar from an outer circumference, and a screw mechanism fixing the intermediate portion (a2) while allowing a horizontal rotation thereof within a prescribed range. The intermediate portion (a2) includes a screw mechanism secured to the handlebar mount portion (a1) and a rail portion to which the component attachment portion (a3) is mounted. The component attachment portion (a3) includes an engagement groove engaging to the rail of the intermediate portion, a stopper mechanism fixing the engagement to that rail, and a component fixing screw mechanism for fixing a component.

The fixing apparatus described above allows for easy attachment of components to a handlebar or the like while adjusting an orientation of components such as a headlamp.

In addition, Japanese Utility Model Registration No. 2602582 proposes a fixing apparatus with an excellent adaptability to an object, using a band-like securing component so as to attain easy attachment of components to objects of a variety of sizes. In this fixing apparatus, two bands having each one end connected to each other are wound on the outer circumference of a pipe. The fixing apparatus includes a first band having a convex portion formed on the outer circumference side of an end portion and a second band having a concave portion formed on an inner circumference side of the end portion. End portions without convex and concave portions of the first and second bands are connected by a screw to each other, and end portions with the convex and concave portions of the first and second bands are pulled through a member. Accordingly, the convex portion is inserted in the concave portion, and engagement is thus achieved. Two bands fasten the object portion in this manner. Consequently, components can be fixed to the pipe, which is the object portion, while the outer circumference of the pipe is pressed with the bands.

With the use of this fixing apparatus of a single-type, a headlamp or a speed meter can be fixed to a variety of types of bicycles with a different size.

On the other hand, it is difficult to perform attachment, removal, loosening, and tightening with the conventional fixing apparatus as described above. For example, in the case of the fixing apparatus having three separate sections above, a mechanism for the component attachment portion (a3) or the intermediate portion (a2) tends to be complicated, and the manufacturing cost is not readily reduced. Moreover, it is difficult to achieve firm fastening because many parts are interposed. In addition, further increased tightening or the like is difficult when a band-like securing component is used. Significant change with time can be observed in maintaining a fastened state attained by engagement of the convex portion and concave portion, and it is difficult to maintain strong fastening force. Therefore, a fixing apparatus readily maintaining strong fixation with a simplified mechanism in a stable manner for a long time without limited to an application to a bicycle has been desired.

SUMMARY OF THE INVENTION

An object of the present invention is to provide a fixing apparatus capable of maintaining strong fixation with a simplified mechanism in a stable manner for a long time.

A fixing apparatus according to the present invention fixes a component to an object. The fixing apparatus includes a plurality of arms supported on one end, having free another end, and capable of changing a range of enclosure so as to grasp the object; a base member supporting the plurality of arms; and an arm driving member changing a position relative to the base member, and pressing the plurality of arms with its edge to change the range of enclosure by the arms.

With the above-described structure, the object can be grasped firmly by an extremely simplified mechanism, and this grasp state can be maintained. Accordingly, firm fixing can be achieved with bare hands, for example. The range of enclosure by the arms above refers to a range enclosed by two arms if two arms are employed, for example. If three or more arms are provided, the range of enclosure by the arms refers to a range enclosed by three or more arms.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8A shows an example in which the object portion has a small diameter.

FIG. 8B shows an example in which the shape of the object portion matches to an arc shape of the arm.

FIG. 8C shows an example in which the object portion has a large diameter.

DESCRIPTION OF THE PREFERRED EMBODIMENTS

Figure 1:
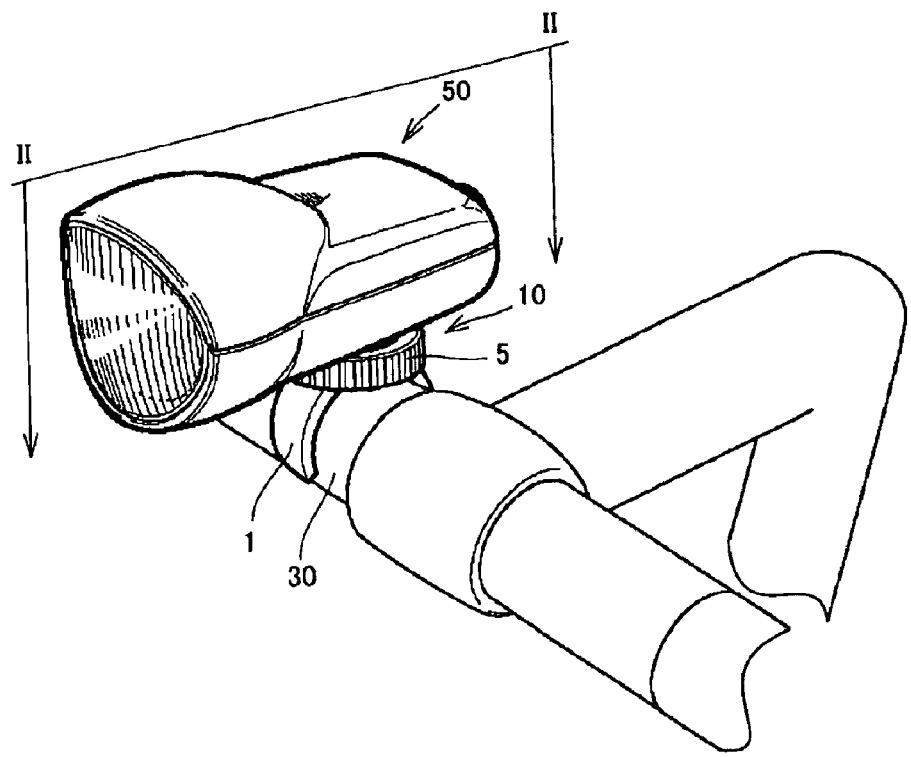
FIG. 1 illustrates a fixing apparatus fixing a headlamp to a handlebar of a bicycle in an embodiment of the present invention.

In the following, an embodiment of the present invention will be described with reference to the figures. FIG. 1 shows a state in which a headlamp is fixed to the handlebar of a bicycle with the fixing apparatus in the embodiment of the present invention. A fixing apparatus 10 mounted with a headlamp 50 grasps the outer circumference of a pipe-like handlebar 30 with an arm 1 driven by an arm driving member 5 so as to fix headlamp 50 to handlebar 30.

Figure 2:
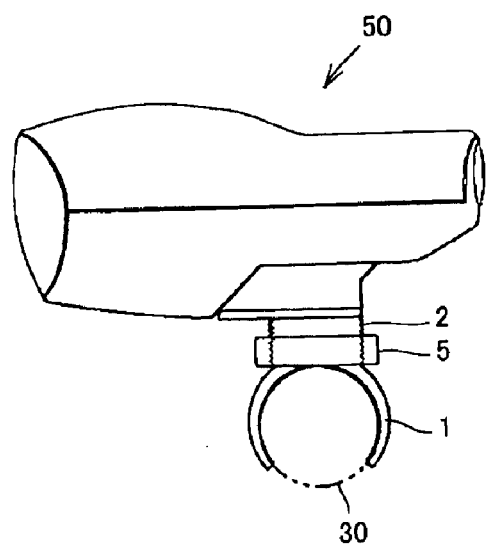
FIG. 2 is a partial cross-section along the line II—II in FIG. 1.

FIG. 2 is a partial cross-section of a portion fixing the headlamp, along the line II—II in FIG. 1. A male screw thread is formed on the outer circumference of a base member 2. In an upper end portion of the base member, headlamp 50 is screwed to be fit and mounted. Arm driving member 5 having a female screw thread cut on its inner circumference is screwed to the lower end of base member 2, to press two arc-like arms 1 facing to each other. Then, a stress is applied to the arms, which in turn press handlebar 30.

Figure 3:
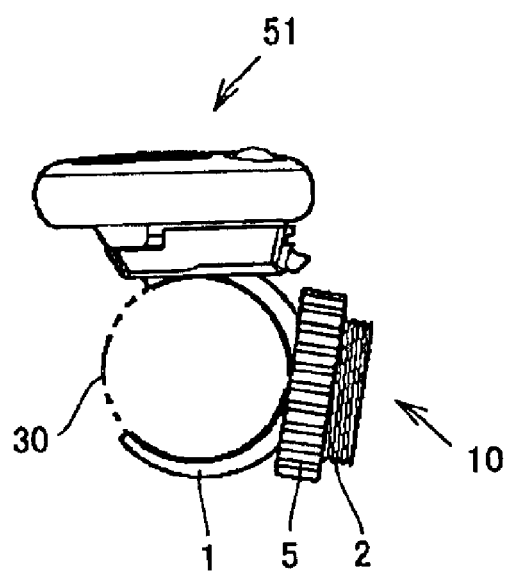
FIG. 3 illustrates a fixing apparatus fixing a speed meter to a handlebar of a bicycle in an embodiment of the present invention.

FIG. 3 shows a state in which a speed meter 51 is fixed to handlebar 30 with fixing apparatus 10 in the embodiment of the present invention. Speed meter 51 is fixed to one of two arms 1. Fixing may be achieved with a screw or an adhesive. Whereas the fixing apparatus shown in FIG. 1 has grasped the handlebar from above along a direction of gravity, fixing apparatus 10 shown in FIG. 3 grasps the handlebar from the side so as to intersect the direction of gravity.

Figure 4:
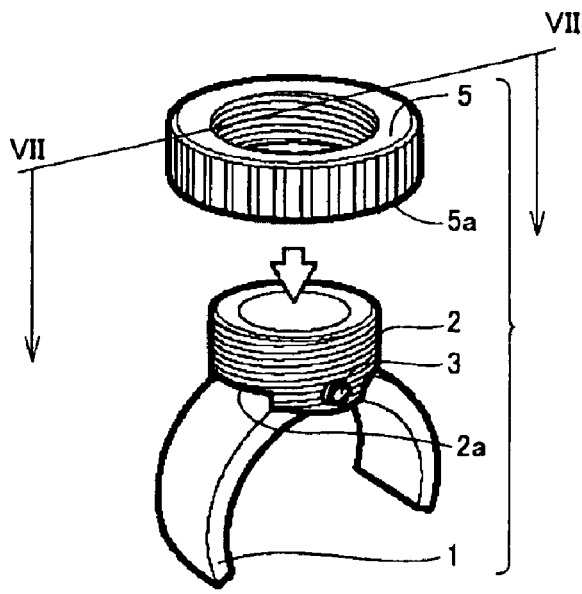
FIG. 4 illustrates a state in which an arm driving member (nut) is used in the fixing apparatus in FIG. 1.

FIG. 4 is a perspective view illustrating the fixing apparatus of the present embodiment. In FIG. 4, a rotation pin 3 serving as a connection member connecting each one end of a plurality of arms to each other passes through the center (axis line) of tubular base member 2, and opposite ends of the rotation pin are fixed to the tubular portion. The end portions of two arc-like arms 1 facing to each other are pivotably attached to rotation pin 3. A recess or cut portion 2a is provided in the base member 2 for receiving the arms 1.

Figure 5:
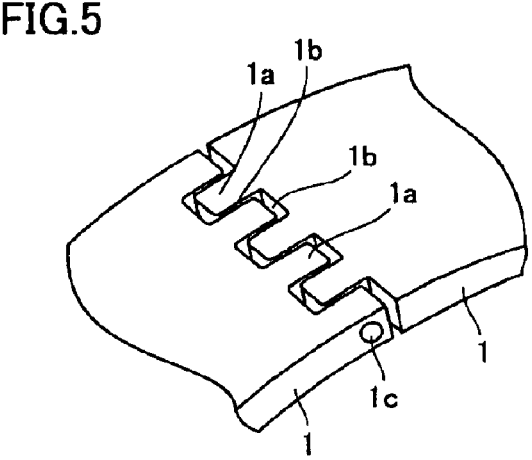
FIG. 5 illustrates a connection mechanism for arms in the fixing apparatus in FIG. 1.

As a structure for an arm end portion in which two arms facing to each other are pivotably connected to rotation pin 3, a structure as shown in FIG. 5 may be employed, for example. In the end portions of the two arms facing to each other, a convex portion *a* and a concave portion 1b complementary to each other are formed, and convex portion 1a is inserted into concave portion 1b. A hole 1c through which the rotation pin penetrates is provided in the center of thickness of convex portions of both arms. Rotation pin 3 passing through the hole provided in base member 2 is inserted into hole 1c to implement a hinge structure along with two arms. Rotation pin 3 attains a function as a connection member connecting two arms. Base member 2 supports two arms by supporting rotation pin 3 serving as the connection member. In other words, base member 2 supports the hinge structure described above.

As a variation of the above-described example, an arm structure including two arms described above may be formed as one piece by integral molding. In the arm structure manufactured by integral molding, a connection portion to which two arms are connected (root portion) has a smaller thickness than that of an arm portion so as to have smaller rigidity. That is, the connection portion is more likely to be elastically deformed when the arms are driven by the arm driving member. The integrally formed arms are placed on a shaft such as a pin or a bar-like member so as to straddle the connection portion (root portion). In other words, the arm structure is suspended from the shaft at the root portion.

In such a structure, when edges of the arm driving member abut on the respective arms to narrow the range of enclosure by two arms, the shaft of the bar-like member or the pin fixed to the base member supports the connection portion (root portion) of the two arms against the stress applied from the arm driving portion. Here, the connection member is implemented by the connection portion (root portion) of the two arms and the shaft such as the pin or the bar-like member.

In the arm structure manufactured by integral molding described above, it is not necessary to pass the rotation pin through the end portions of the arm. Therefore, the pin and the base member are also advantageously manufactured as one piece by integral molding.

A metal such as a variety of steels including stainless steel, aluminum, titanium, magnesium alloy, or the like may be used for the rotation pin described above. In addition, a variety of plastics, engineering plastic, metal, or the like may be used for the base member, the arm driving member (nut), and the arm. In selecting a material such as plastic, engineering plastic or metal, strength, elastic modulus, rigidity, durability, or the like is taken into account.

When the hinge structure including two arms is formed with the rotation pin described above, the rotation pin and the base member above may be manufactured by integral molding. The two arms are, for example, provided with a groove in order to avoid a problem during fastening, and the arms can pivotably be attached to the rotation pin.

Figure 6:
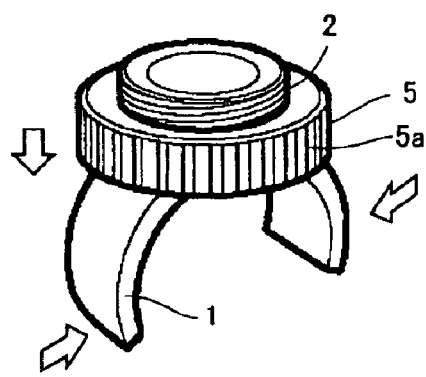
FIG. 6 illustrates a state in which the arms attempt to grasp an object portion in the fixing apparatus in FIG. 1.

FIG. 6 shows a state in which a nut 5 serving as the arm driving member is screwed and moved toward the arms to press the same, so that the arms exert fastening force to the object portion (not shown). Here, desirably, nut 5 has a large outer diameter in order to allow turning and tightening of the same with bare hands. Moreover, grooves 5a may be provided on the outer circumference of the nut along the axis of the tube.

Figure 7:
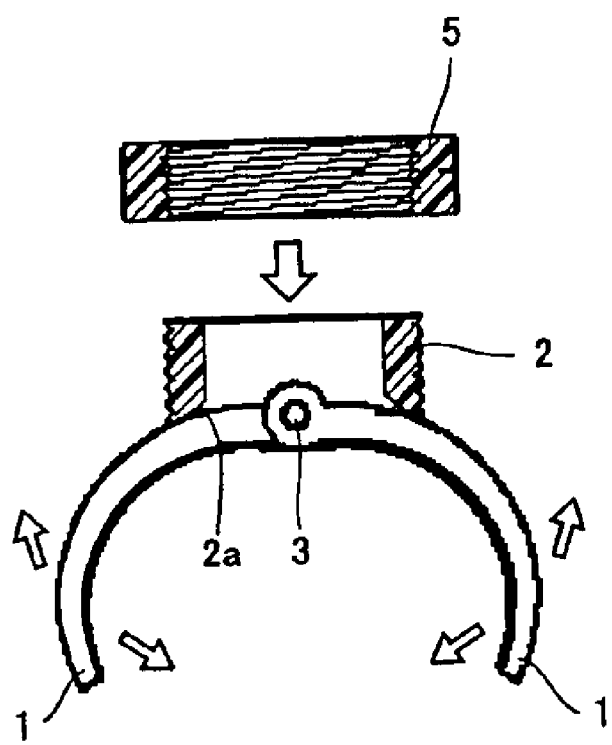
FIG. 7 is a cross-sectional view along the line VII—VII in FIG. 4.

FIG. 7 is a cross-sectional view along the line VII—VII in FIG. 4. Arms 1 are supported by base member 2 along with rotation pin 3. The arms are pressed by arm driving member 5 screwed to base member 2. Accordingly, the range of enclosure by the arms is narrowed to clamp the object portion, thereby attaining firm grasping.

FIGS. 8A to 8C show three examples. FIG. 8A shows an example in which the pipe has a small diameter; FIG. 8B shows an example in which the pipe has an intermediate diameter; and FIG. 8C shows an example in which the pipe has a large diameter. In each example shown in FIGS. 8A to 8C, a position A where arm driving member 5 comes in contact with arm 1 is closer to the object portion than to rotation pin 3 serving as the arm connection member. By implementing such a positional relation in a fix state, the arms can readily grasp or clamp the object portion. As shown in FIGS. 8A to 8C, the larger diameter the object portion has, the closer the contact position A described above comes toward rotation pin 3 serving as the connection member. Therefore, the distance between the tip ends of the arms approaches the diameter of the object portion, and hence, fixation force of the arms is made smaller.

Magnitude of the force with which arms 1 grasp the object portion is not determined by the positional relation described above. Instead, factors such as a contact length or a contact area of arms 1 and object portion 30 significantly affect the grasping force. Among the three examples shown in FIGS. 8A to 8C, the contact length or the contact area described above is largest in FIG. 8B where the arc shape of arm 1 matches the shape of the object portion. Here, a maximum grasping force or fixation force is attained.

By using the above-described fixing apparatus with a simplified structure, a headlamp or a speed meter can readily and firmly be fixed to a handlebar or the like.

Other embodiments of the present invention will now be described successively, including the features set forth in the embodiment above.

The following structure may be employed. The base member and the arm driving member are tubular members. A male screw thread is cut on the outer circumference of the base member, and a female screw thread is cut on the inner circumference of the arm driving member. The arm driving member is screwed to the base member.

With such a structure, the tubular arm driving member is rotated around the base member and moved along the axis of the tube. Then, the end portion of the arm driving member is pressed against the arms, and the arms can firmly grasp the object portion. This fixing operation is extremely simplified.

In addition, a connection member connecting ends of the plurality of arms described above may be provided, and the base member may support the arms with the connection member interposed.

By connecting the ends of the arms with the rotation pin, further simplified structure is obtained. Then, tightening the arm toward the object portion can be facilitated.

The above-described connection member is provided at one end portion of the base member. The arm is arranged outwardly from the one end portion. The arm driving member can come in contact with the arm in a position outside the connection member at the one end portion of the base member while it is fixed to the object.

With this structure, a stress for the arm to grasp the object can readily be applied by driving the arm driving member. As a result, the arms can grasp the object further firmly.

The following structure may be employed. The connection member described above is provided as the rotation pin provided in the base member. Two arc-like arms facing to each other are pivotably attached to the rotation pin at each one end, so as to grasp a pipe along the outer circumference.

With this structure, the arms are fixed to the base member with a simplified structure, and can readily and firmly be fixed to the pipe-like object portion.

Opposing two cut portions are provided in end portions on the sides where the arms are located, of the tubular base member. The ends of the rotation pin are fixed to opposing tube ends except for the cut portions, and the arm can be arranged so as to face the cut portion.

With this structure, the arm can be shaped like an arc, and can be arranged so as to pass through the cut portion or outside thereof. Therefore, the arm driving member can press the arms without moving the arm driving member as far as a position close to the end of the base member. Accordingly, reaction force applied from the arm to the arm driving member when the arms grasp the object portion can be born also by the base member to a large extent in a stable manner. Thus, firm fixing can readily be attained.

Grooves along the axis of the tube may be provided on the outer circumference of the arm driving member. With this structure, the arm driving member can readily be rotated with bare hands so as to press the arms. Strong fastening force can thus be applied to the arms.

Though an example of two arc-like arms facing to each other has been described in the embodiment of the present invention described above, the embodiment of the present invention is not limited thereto. The fixing apparatus according to the embodiment of the present invention only requires a plurality of arms, and therefore three or four arms may be provided, for example. In such a case, any structure for connecting the arms to the connection member may be employed so long as the end portions of the arms are connected to each other. For example, such a structure that end portions of three arms may be concentrated to one location to exhibit a cone shape may be employed. If the three arms are formed integrally as one piece by integral molding, the end portions of the arms concentrated to one location and an arm support member causing those end portions to be supported by the base member implement the connection member described above. If the connection member is arranged as described above, the manufacturing method is simplified, and fastening of the arm to the object portion can be facilitated.

The arm may be formed with an elastic member having prescribed rigidity. In such a case, the arm is driven by the arm driving member to undergo elastic deformation, thereby narrowing the range of enclosure to grasp the object portion. The object portion does not need to have a pipe-like shape, and it may be a tip end portion of a bar, for example. The fixing apparatus according to the present invention may be adapted to any device or instrument as the object portion, without limited to each part of a bicycle.

The fixing apparatus according to the present invention can maintain strong fixation with a simplified mechanism in a stable manner for a long time without limited to an application to a bicycle. Therefore, widespread use of this fixing apparatus in an industry or a household is expected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fixing apparatus fixing a component to an object, comprising:

a plurality of arms supported on one end with the other end free and capable of changing a range of enclosure so as to grasp the object;

a base member supporting said plurality of arms;

an arm driving member changing a position relative to said base member, and pressing said plurality of arms with its edge to change the range of enclosure by said arms, and a rotation pin connecting ends of said plurality of arms, wherein said base member supports said arms together with said rotation pin.

2. The fixing apparatus according to claim 1, wherein said base member and said arm driving member are tubular members, a male screw thread is cut on an outer circumference of said base member, a female screw thread is cut on an inner circumference of said arm driving member, and said arm driving member is screwed to said base member.

3. The fixing apparatus according to claim 1, wherein said rotation pin is provided at one end of said base member, said arms are arranged outwardly from said one end, and said arm driving member comes in contact with said arms in a position on a side outer than the rotation pin position at said one end of said base member while it is fixed to said object.

4. The fixing apparatus according to claim 1, wherein said rotation pin is provided in said base member, and two arc-like arms facing to each other are pivotably attached to said rotation pin at each one end, so as to grasp a pipe along the outer circumference.

5. The fixing apparatus according to claim 4, wherein opposing two cut portions are provided in end portions on sides where said arms are located, of said tubular base member, ends of said rotation pin are fixed to opposing tube ends except for the cut portions, and said arms are arranged so as to face said cut portion.

* * * * *